(12) United States Patent
Cawley

(10) Patent No.: US 7,283,042 B1
(45) Date of Patent: Oct. 16, 2007

(54) SYSTEM FOR OBSERVING THE AREA LATERALLY BEHIND A VEHICLE

(76) Inventor: Fred R. Cawley, 4648 Cochise Trail, Richmond, VA (US) 23238

( * ) Notice: Subject to any disclaimer, the term of this patent is extended or adjusted under 35 U.S.C. 154(b) by 220 days.

(21) Appl. No.: 11/272,270

(22) Filed: Nov. 14, 2005

(51) Int. Cl.
*B60Q 1/00* (2006.01)
*G08G 1/054* (2006.01)

(52) U.S. Cl. .................. 340/435; 340/937; 348/148
(58) Field of Classification Search ............... 340/435, 340/932.2, 937; 348/148, 169, 174
See application file for complete search history.

(56) References Cited

U.S. PATENT DOCUMENTS

| | | | |
|---|---|---|---|
| 5,574,443 A | | 11/1996 | Hsieh |
| 5,646,614 A | | 7/1997 | Abersfelder et al. |
| 5,765,063 A | * | 6/1998 | Fukuda et al. ............... 396/332 |
| 6,222,447 B1 | | 4/2001 | Schofield et al. |
| 6,693,524 B1 | | 2/2004 | Payne |
| 6,819,231 B2 | | 11/2004 | Berberich et al. |
| 6,891,563 B2 | | 5/2005 | Schofield et al. |
| 6,919,917 B1 | | 7/2005 | Janssen |
| 7,005,974 B2 | * | 2/2006 | McMahon et al. ........... 340/435 |
| 7,106,183 B2 | * | 9/2006 | Hong ......................... 340/435 |
| 7,245,207 B1 | * | 7/2007 | Dayan et al. ................ 340/435 |

* cited by examiner

*Primary Examiner*—Toan N. Pham
(74) *Attorney, Agent, or Firm*—Norman B. Rainer

(57) ABSTRACT

A system for viewing the area laterally rearward of an automotive vehicle to enhance the safety of backing out of a parking space includes a license plate securing frame having a compartment that houses small wireless transmitting TV cameras, and viewing screens located in front of the driver. The TV cameras are battery operated, thereby enabling the frame to be attached to the vehicle without special installation or wiring.

8 Claims, 3 Drawing Sheets

US 7,283,042 B1

SYSTEM FOR OBSERVING THE AREA LATERALLY BEHIND A VEHICLE

BACKGROUND OF THE INVENTION

1. Field of the Invention

This invention relates to the visualization of regions rearwardly on both sides of an automotive vehicle, and particularly concerns a system for facilitating the safe backing of an automotive vehicle out of a parking space.

2. Description of the Prior Art

The commonplace side and rear view mirrors employed in most automotive vehicles generally provide the driver with adequate information during highway travel. However, such mirrors are ineffective in the course of backing out of a parking space bounded by adjacent vehicles. In such situation, the driver requires a detailed visualization of vehicles approaching from either lateral direction. The necessary visualization of oncoming vehicles is particularly difficult when either or both of the adjacently parked vehicles may be of large size.

The improvement of a driver's visualization of surrounding areas has earlier been addressed by the use of small closed circuit television cameras which feed a picture to a viewing screen positioned in front of the driver. Examples of such prior art include the following:

| U.S. Pat. No. | Inventor | Issue Date |
|---|---|---|
| 6,919,917 | Janssen | Jul. 19, 2005 |
| 6,891,563 | Schofield | May 10, 2005 |
| 6,819,231 | Berberich | Nov. 16, 2004 |
| 6,693,524 | Payne | Feb. 17, 2004 |
| 6,222,447 | Schofield, et. al. | Apr. 24, 2001 |
| 5,646,614 | Abersfelder et. al. | Jul. 8, 1997 |
| 5,574,443 | Hsieh | Nov. 12, 1996 |
| 4,277,804 | Robison | Jul. 7, 1981 |

In most prior rear imaging embodiments, a single TV camera having a wide angle lens is pointed rearwardly to capture the entire area of interest. This produces an image which is usually distorted and so cluttered with unwanted extraneous details that important features cannot easily be discerned. It is also to be noted that prior rear imaging embodiments usually involve complex systems that require factory installation at the time of manufacture of the vehicle.

It is accordingly an object of the present invention to provide a laterally rearward imaging system which can be easily added to substantially any vehicle following its manufacture.

It is another object of this invention to provide a rear imaging system as in the foregoing object which provides an undistorted complete view of areas laterally behind a vehicle.

It is a further object of the present invention to provide a system of the aforesaid nature of durable construction and amenable to low cost production.

These objects and other objects and advantages of the invention will be apparent from the following description.

SUMMARY OF THE INVENTION

The above and other beneficial objects and advantages are accomplished in accordance with the present invention by a rear imaging system for an automotive vehicle having a rear license plate comprising:

a) a rectangular frame for securing said license plate and attaching it to said vehicle, said frame including an upper horizontal portion having mounting apertures, and a lower horizontal portion, said horizontal portions extending to lateral extremities that join with oppositely paired vertical side portions, b) a waterproof compartment outwardly protruding from said lower horizontal portion and elongated between opposite end panels located adjacent said side portions, c) left and right camera units positioned within said compartment adjacent opposite extremities thereof, each camera unit comprised of a miniature TV camera with interactive wireless signal-transmitting feature, d) at least one dry cell battery located within said compartment and adapted to power one or both said camera units, and e) left and right display screens which receive signals from said left and right camera units, respectively, and produce the consequent images, said screens being located within said vehicle within easy view of the driver.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
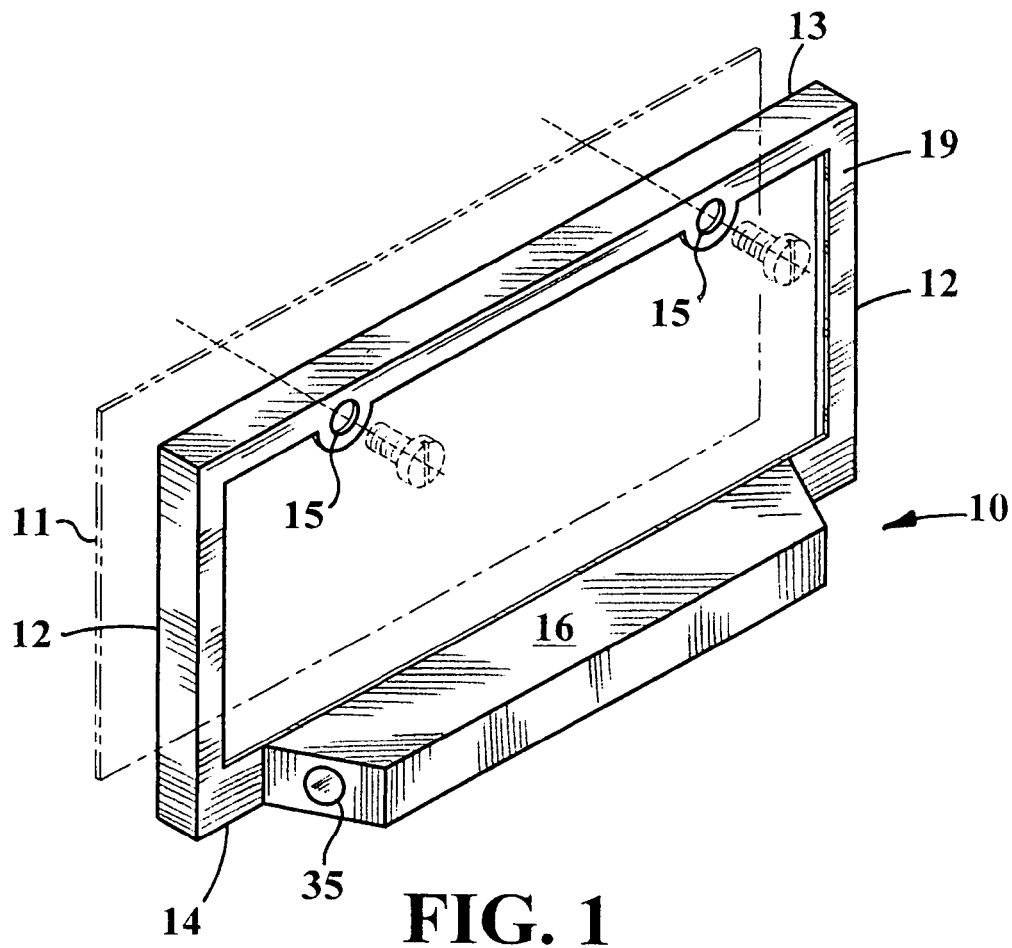
FIG. 1 is a rear and side perspective view of an embodiment of the frame component of the rear imaging system of the present invention shown in exploded juxtaposition with a license plate shown in phantom outline and not a part of this invention.
Figure 2:
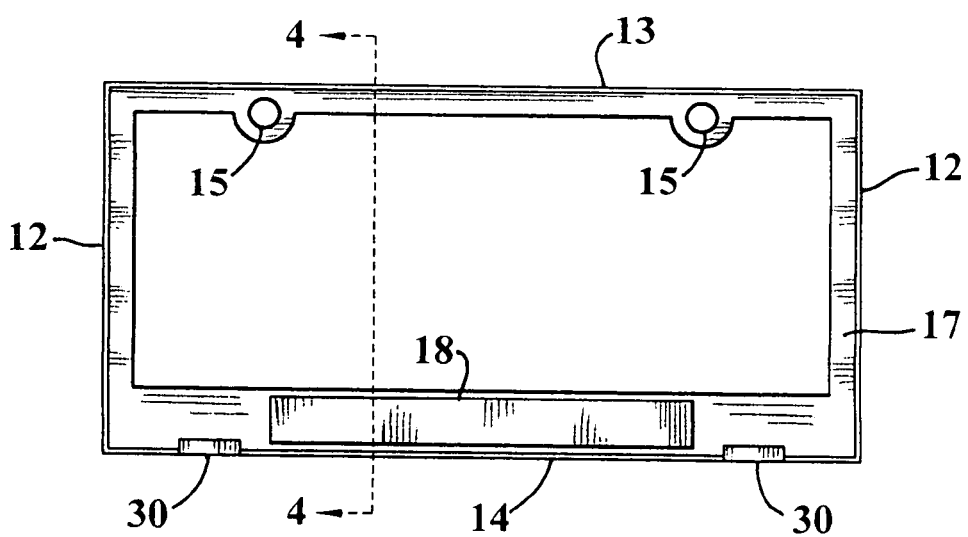
FIG. 2 is a front view of the frame component of FIG. 1.
Figure 3:
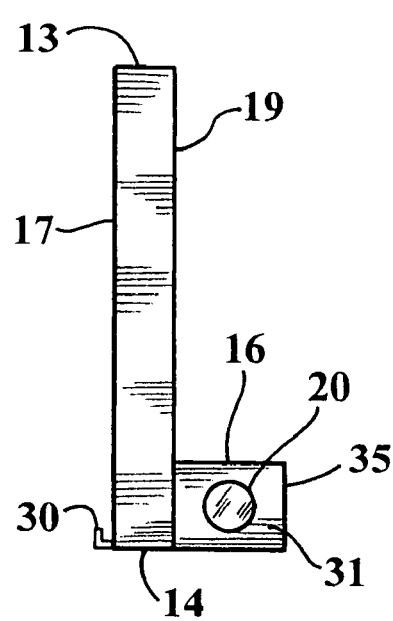
FIG. 3 is a side view of the frame component of FIG. 1.
Figure 4:
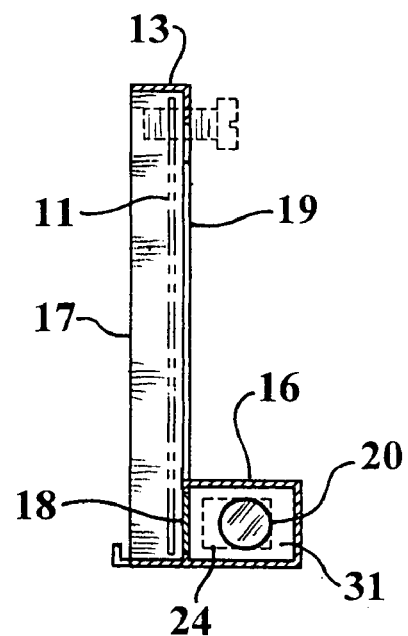
FIG. 4 is a sectional view taken in the direction of the arrows upon the line 4-4 of FIG. 2.
Figure 5:
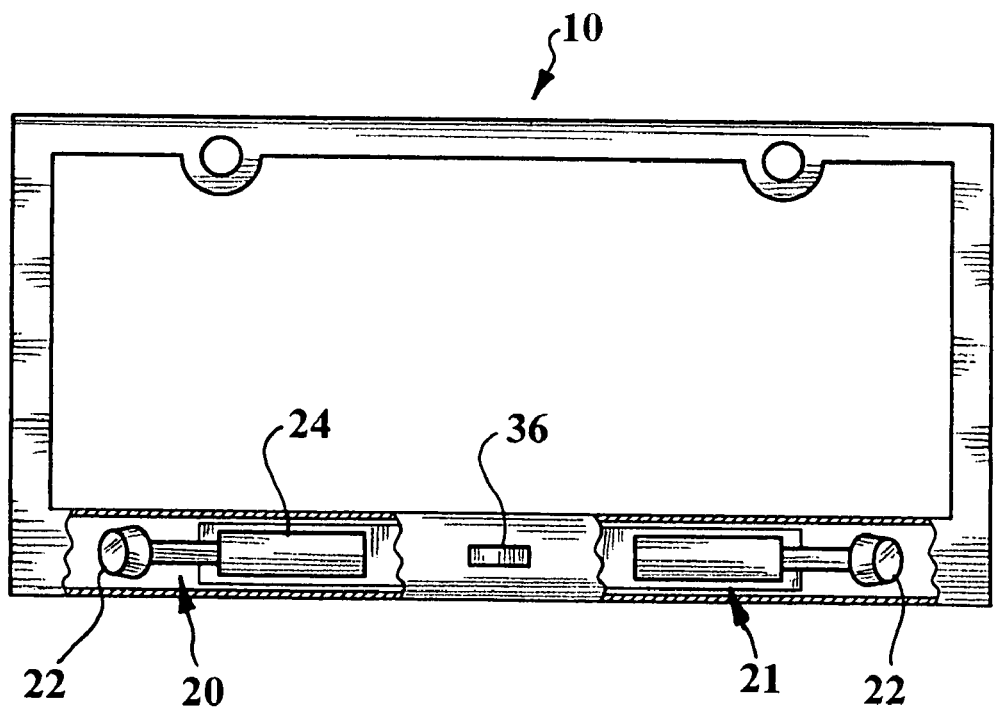
FIG. 5 is a rear view of the frame component of FIG. 1 with portions broken away to show internal details.
Figure 6:
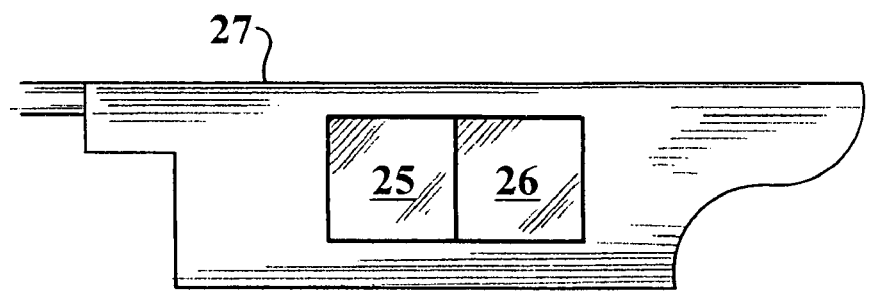
FIG. 6 is a view of the display screen components of the rear imaging system of this invention.

Referring now to FIGS. 1-7, a rectangular frame component 10 of the rear imaging system of the present invention is shown in exploded juxtaposition relative to a license plate 11 intended to be mounted upon the rear bumper or rear skirt or trunk panel contiguously above the rear bumper of a vehicle.

Frame 10 is comprised of opposed vertically directed side portions 12, upper horizontal portion 13, and lower horizontal portion 14. The frame is preferably of substantially integral construction and fabricated of metal or plastic. At least two mounting apertures 15 are located in said upper horizontal portion to permit passage of threaded bolts that secure the frame and license plate to the vehicle. The frame is further bounded by forward and rearward faces, 17 and 19, respectively. A waterproof compartment 16 protrudes rearwardly from lower horizontal portion 14, and is equipped with at least one access panel 18 located in forward face 17. Said compartment is bounded at its lateral extremities by end panels 31 which are convergently angled toward the center of the frame. Forward face 17 may have brackets 30 mounted upon the lowermost portion of the frame for the further securement of license plate 11.

Figure 7:
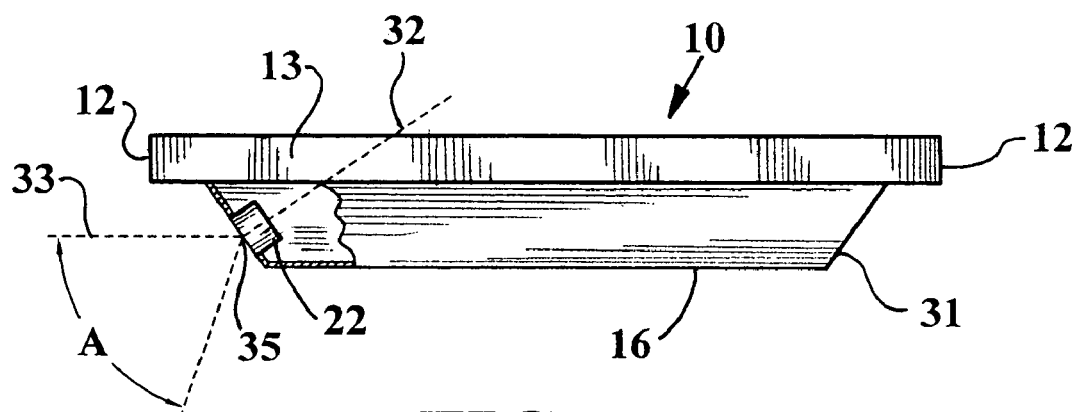
FIG. 7 is a top view of the frame component of FIG. 1, with portions broken away.

Left and right camera units 20 and 21, respectively, are positioned within compartment 16 adjacent the opposite extremities thereof. Each camera unit is comprised of a miniature TV camera 22 having a wireless signal-transmitting feature. TV cameras of suitable nature for use in this invention are operable by a 9 volt battery, and have a viewing angle preferably between 45 and 60 degrees with respect to its axis of view. A particularly well suited transmitter camera is Model VC200 sold by the Enkueros Company of Miami, Fla. Suitable cameras focus between one inch and infinity and provide a resolution of at least 350 lines/inch. The camera units mounted within compartment 16 are sealed to viewing apertures 35 in end panels 31 in a manner such that the axis 32 of the camera is orthogonal to the end panel, as shown in FIG. 7. In such manner of mounting, the forward-most extremity 33 of the viewing angle A is substantially parallel to frame 10.

At least one dry cell battery 24 is located within compartment 16 and adapted to power one or both cameras. The batteries are positioned adjacent an access panel 18 in a manner to facilitate replacement of the battery while maintaining the waterproof integrity of compartment 16. An on/off switch 36 may be positioned externally of compartment 16 to control battery operation. Power may also be supplied directly from the vehicle's battery by using a transformer adapter that provides the appropriate DC voltage.

Left and right display screens 25 and 26, respectively, receive signals from said left and right camera units, respectively, producing the consequent images with proper left-to-right mirror-image orientation. The display screens are preferably integrated as a single panel which may be conveniently attached to a sun visor 27 within the vehicle above the steering wheel for convenient viewing by the driver. Said attachment may be achieved by way of VELCRO hook and loop attachment material, magnetic sheet material, or elastomeric bands that surroundingly embrace the visor and panel. A battery and on/off switch or electrical lead to the vehicle's battery may also be associated with the display panel.

Figure 8:
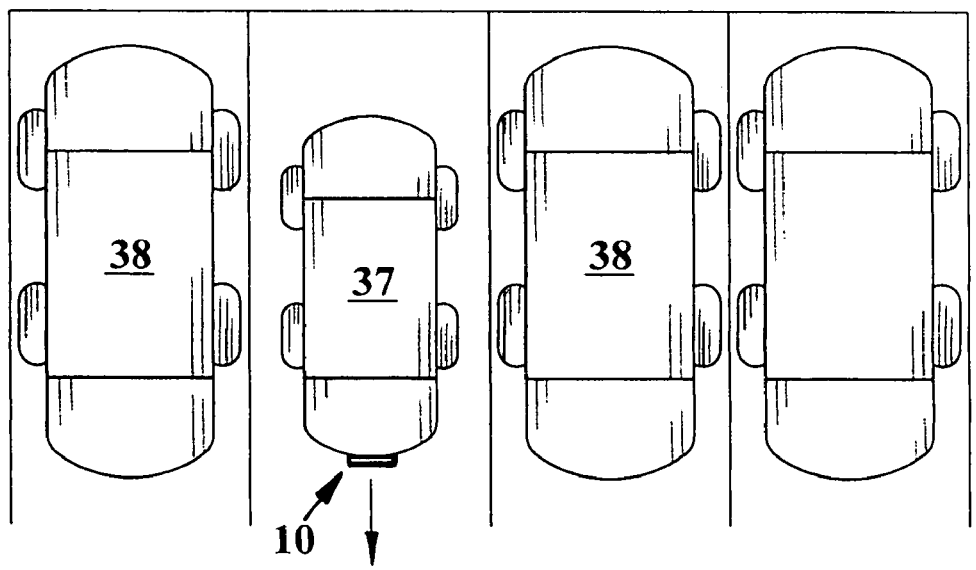
FIG. 8 illustrates a typical configuration of parked vehicles wherein the viewing system of this invention is of greatest use.

By virtue of the viewing system of this invention a vehicle 37, as shown in FIG. 8 may be safely backed out of a parking place even when sandwiched between larger vehicles 38 that block the driver's vision.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A rear imaging system for an automotive vehicle having a rear license plate comprising:
   a) a rectangular frame for securing said license plate and attaching it to said vehicle, said frame including an upper horizontal portion having mounting apertures, and a lower horizontal portion, said horizontal portions extending to lateral extremities that join with oppositely paired vertical side portions,
   b) a waterproof compartment outwardly protruding from said lower horizontal portion and elongated between opposite end panels located adjacent said side portions,
   c) left and right camera units positioned within said compartment adjacent opposite extremities thereof, each camera unit comprised of a miniature TV camera with interactive wireless signal-transmitting feature,
   d) at least one dry cell battery located within said compartment and adapted to power one or both said camera units, and
   e) left and right display screens which receive signals from said left and right camera units, respectively, and produce the consequent images, said screens being located within said vehicle within easy view of the driver.

2. The imaging system of claim 1 wherein the end panels of said waterproof compartment contain viewing apertures.

3. The imaging system of claim 2 wherein said end panels are convergently angled toward the center of the frame.

4. The imaging system of claim 1 wherein said frame is further bounded by forward and rearward faces.

5. The imaging system of claim 4 wherein brackets are mounted upon said forward face for the further securement of said license plate.

6. The imaging system of claim 3 wherein said camera units have viewing angles between 45 and 60 degrees with respect to a center viewing axis.

7. The imaging system of claim 6 wherein said camera units interact with said viewing apertures in a manner such that the center viewing axis is orthogonal to said end panel and the forward-most extremity of said viewing angle is substantially parallel to said frame.

8. The imaging system of claim 4 wherein an access panel is located in said forward face.

* * * * *